United States Patent
Martinez et al.

(10) Patent No.: US 12,177,153 B2
(45) Date of Patent: Dec. 24, 2024

(54) COMMUNICATIONS WITH UTILIZATION OF CURRENT PREAMBLE FOR DECODING PREVIOUS MESSAGE

(71) Applicant: NXP B.V., Eindhoven (NL)

(72) Inventors: Vincent Pierre Martinez, Roques (FR); Alessio Filippi, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/188,607

(22) Filed: Mar. 1, 2021

(65) Prior Publication Data

US 2021/0281377 A1   Sep. 9, 2021

(30) Foreign Application Priority Data

Mar. 6, 2020 (EP) .................................. 20305237

(51) Int. Cl.
| H04L 5/00 | (2006.01) |
| H04L 1/1867 | (2023.01) |
| H04L 25/02 | (2006.01) |

(52) U.S. Cl.
CPC ............ *H04L 5/0053* (2013.01); *H04L 1/189* (2013.01); *H04L 5/0044* (2013.01); *H04L 5/0078* (2013.01); *H04L 25/0202* (2013.01)

(58) Field of Classification Search
CPC ..... H04L 5/0053; H04L 1/189; H04L 5/0044; H04L 5/0078; H04L 25/0202
See application file for complete search history.

(56) References Cited

U.S. PATENT DOCUMENTS

| 6,404,826 | B1 | 6/2002 | Schmidl et al. |
| 10,790,937 | B1* | 9/2020 | Sun ...................... H04L 1/1867 |
| 2003/0072355 | A1 | 4/2003 | Lee et al. |
| 2010/0260046 | A1 | 10/2010 | Reumerman et al. |
| 2012/0140835 | A1 | 6/2012 | Czink et al. |
| 2013/0177090 | A1* | 7/2013 | Yang ...................... H04L 5/0023 375/260 |
| 2016/0157127 | A1 | 6/2016 | Zeger et al. |
| 2019/0261352 | A1* | 8/2019 | Cariou .............. H04W 72/0453 |
| 2020/0053706 | A1* | 2/2020 | Sadeghi ................ H04W 72/30 |
| 2021/0006449 | A1* | 1/2021 | Zhibo .................. H04L 27/2678 |

(Continued)

FOREIGN PATENT DOCUMENTS

| CN | 104205714 A | 12/2014 |
| CN | 105103484 A | 11/2015 |

(Continued)

OTHER PUBLICATIONS

Fischer, M., "Adaptive Repetition Scheme for NGV", IEEE 802.11-19/0784r0, May 2019.

(Continued)

*Primary Examiner* — Jackie Zuniga Abad

(57) ABSTRACT

Aspects of the present disclosure are directed to wireless communications involving successively-received messages. As may be implemented consistent with one or more aspects characterized herein, a preamble section (122) of a currently-received message (120) is used in decoding a previously-received message (110), for wireless transmissions from a wireless transmitter (102) on a wireless communications channel (101). The current and previous message are received in succession with a time gap (130) therebetween.

23 Claims, 3 Drawing Sheets

(56) References Cited

U.S. PATENT DOCUMENTS

2021/0091889 A1\* 3/2021 Martinez ................. H04L 69/22
2021/0092038 A1\* 3/2021 Burchard ................. H04L 1/08
2022/0255693 A1\* 8/2022 Lou ..................... H04L 27/2613

FOREIGN PATENT DOCUMENTS

CN      107888522 A     4/2018
CN      110691340 A     1/2020

OTHER PUBLICATIONS

Chai et al: "A novel time interpolation channel estimation for IEEE802.11 ac system", 2013 IEEE 4th International Conference on Software Engineering and Service Science, IEEE, Sep. 23, 2015 (Sep. 23, 2015), pp. 722-725.

Alexander et al, "Cooperative Intelligent Transport Systems: 5.9-GHz Field Trials," vol. 99, No. 7, Jul. 2011, Proceedings of the IEEE, 23 pages.

Lei et al., "Receiving and Decoding of System Information in TD-SCDMA", vol. 8, No. 1, Mar. 2007, (English Abstract), Journal of Information Engineering University, 4 pages.

Nokia, Nokia Shanghai Bell, "MSGA PUSCH LBT failure and PDCCH decoding, 3GPP TSG-RAN WG2 Meeting #109-e," Feb. 24-Mar. 6, 2020, 2 pages.

Kim et al., "Improved Decoding Algorithm of Bootstrap Signals for ATSC 3.0 Systems," 2017 IEEE International Symposium on Broadband Multimedia Systems and Broadcasting (BMSB); Dec. 31, 2017, 4 pages.

\* cited by examiner

COMMUNICATIONS WITH UTILIZATION OF CURRENT PREAMBLE FOR DECODING PREVIOUS MESSAGE

CROSS-REFERENCE TO RELATED APPLICATIONS

This application claims the priority under 35 U.S.C. § 119 of European Patent application no. 20305237.8, filed on 6 Mar. 2020, the contents of which are incorporated by reference herein.

OVERVIEW

Aspects of various embodiments are directed to apparatuses and methods for assessing communications.

Wireless communications are used to pass information between transmitters and receivers. For instance, transmissions involving vehicle-to-everything (V2X) communications involve transmission and reception between a vehicle and another entity, and vice versa. As vehicles (e.g., stations) employing V2X can utilize different standards of communication, with a mix of vehicles using older and newer standards operating in the same band and/or channel, ensuring compatibility can be important. For instance, new standards messages may utilize repetitions, as successive retransmissions of a particular message, to enhance quality. Data from repeated messages can be combined to improve performance. However, while V2X communications have been useful, it can be challenging to ensure that transmissions are accurate and efficient.

These and other matters have presented challenges to efficiencies of wireless vehicular communications implementations, for a variety of applications.

SUMMARY

Various example embodiments are directed to issues such as those addressed above and/or others which may become apparent from the following disclosure concerning the communication and processing of wireless messages, using the preamble of a current message in the processing of a previously-received message. In certain example embodiments, aspects of the present disclosure involve using the preamble of a currently-received repetition for channel estimation and decoding of a previously-received version of the repetition. It has been recognized/discovered that, using the preamble section of subsequently-received messages can enhance decoding of a previous message, such as by improving channel estimation and/or providing a replacement for the preamble that may have been interfered with or may otherwise be undesirable. Such approaches can thus address challenges such as those characterized above.

Aspects of the present disclosure are directed to a method as follows. Wireless transmissions are received from a wireless transmitter on a wireless communications channel, and include a current message and a previous message received in succession with a time gap therebetween. Each message has a preamble section and a payload data section, the preamble including information for characterizing the wireless communications channel. For instance, the preamble section may include a short training field (STF), long training field (LTF), and signal field (SIG), with the LTF providing information for characterizing the wireless communications channel (e.g., providing a channel estimate). The previous message is decoded based on the preamble section in the previous message and based on the preamble section in the current message. In certain specific example embodiments, the decoding is carried out using information from the preamble section of the current message, based on the preamble section in the previous message being damaged or otherwise undesirable.

In one or more embodiments, the payload data may include a set of bits received sequentially in time in an orthogonal frequency division multiplexing (OFDM) symbol, and beginning with a first bit and ending with a last bit; and decoding the previous message may include using the preamble section of the previous message to decode a subset of the bits beginning with the first bit and continuing with subsequently received bits in sequential order, and using the preamble section of the current message to decode a subset of the bits beginning with the last bit and continuing with previously received bits in reverse sequential order.

In one or more embodiments, decoding the previous message may include using the preamble section of the previous message to determine a channel estimation of the communications channel, and using the preamble section of the current message to refine the determined channel estimation.

In one or more embodiments, decoding the previous message may include decoding the previous message using the preamble section of the current message in response to the current message being a repetition of the previous message.

In one or more embodiments, decoding the previous message may include decoding bits in the payload data section beginning with a last-received bit and continuing with previously received bits in reverse sequential order.

In one or more embodiments, the method may further include assessing whether the time gap is less than a threshold time gap; and decoding the previous message may be carried out in response to the time gap being less than the threshold.

In one or more embodiments, decoding the previous message may include using the preamble section in the current message to decode the payload data section the previous message in response to the preamble section in the previous message being damaged.

In one or more embodiments, the method may further include providing feedback by re-encoding decoded bits from the previous message to generate re-encoded modulation signals, and comparing the re-encoded modulation symbols to received equalization symbols of the previous message.

In one or more embodiments, decoding the previous message based on the preamble section in the previous message and based on the preamble section in the current message may include using the preamble section in the current message to generate a channel estimation for the channel on which the messages are received.

Another embodiment is directed to an apparatus comprising communication circuitry and coding circuitry. The communication circuitry configured to receive wireless transmissions from a wireless transmitter on a wireless communications channel, the wireless transmissions including a current message and a previous message received in succession with a time gap therebetween. Each message has a preamble section and a payload data section in which the preamble includes information for characterizing the wireless communications channel. The coding circuitry is configured to decode the previous message based on the preamble section in the previous message and based on the preamble section in the current message.

In one or more embodiments, the payload data may include a set of bits received sequentially in time in an orthogonal frequency division multiplexing (OFDM) symbol, and beginning with a first bit and ending with a last bit, and the coding circuitry may be configured to decode the previous message by: using the preamble section of the previous message to decode a subset of the bits beginning with the first bit and continuing with subsequently received bits in sequential order, and using the preamble section of the current message to decode a subset of the bits beginning with the last bit and continuing with previously received bits in reverse sequential order.

In one or more embodiments, the coding circuitry may be configured to decode the previous message by: using the preamble section of the previous message to determine a channel estimation of the communications channel, and using the preamble section of the current message to refine the determined channel estimation.

In one or more embodiments, the coding circuitry may be configured to decode the previous message using the preamble section of the current message in response to the current message being a repetition of the previous message.

In one or more embodiments, the coding circuitry may be configured to decode bits in the payload data section beginning with a last-received bit and continuing with previously received bits in reverse sequential order.

In one or more embodiments, the coding circuitry may be configured to assess whether the time gap is less than a threshold time gap, and to decode the previous message in response to the time gap being less than the threshold.

In one or more embodiments, the coding circuitry may be configured to decode the previous message using the preamble section in the current message to decode the payload data section of the previous message, in response to the preamble section in the previous message being damaged.

In one or more embodiments, the coding circuitry may be configured to: re-encode decoded bits of the payload data section in the previous message; and assess errors in the decoding of bits in the previous message by comparing the re-encoded bits to received bits in the payload data section of the previous message.

In one or more embodiments, the coding circuitry may be configured to adjust the decoding of the previous message in response to the assessing indicating errors in the decoding of the bits in the payload data section of the previous message.

In one or more embodiments, the coding circuitry may be configured to decode the previous message by using the preamble section in the current message to generate a channel estimation for the channel on which the messages are received.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
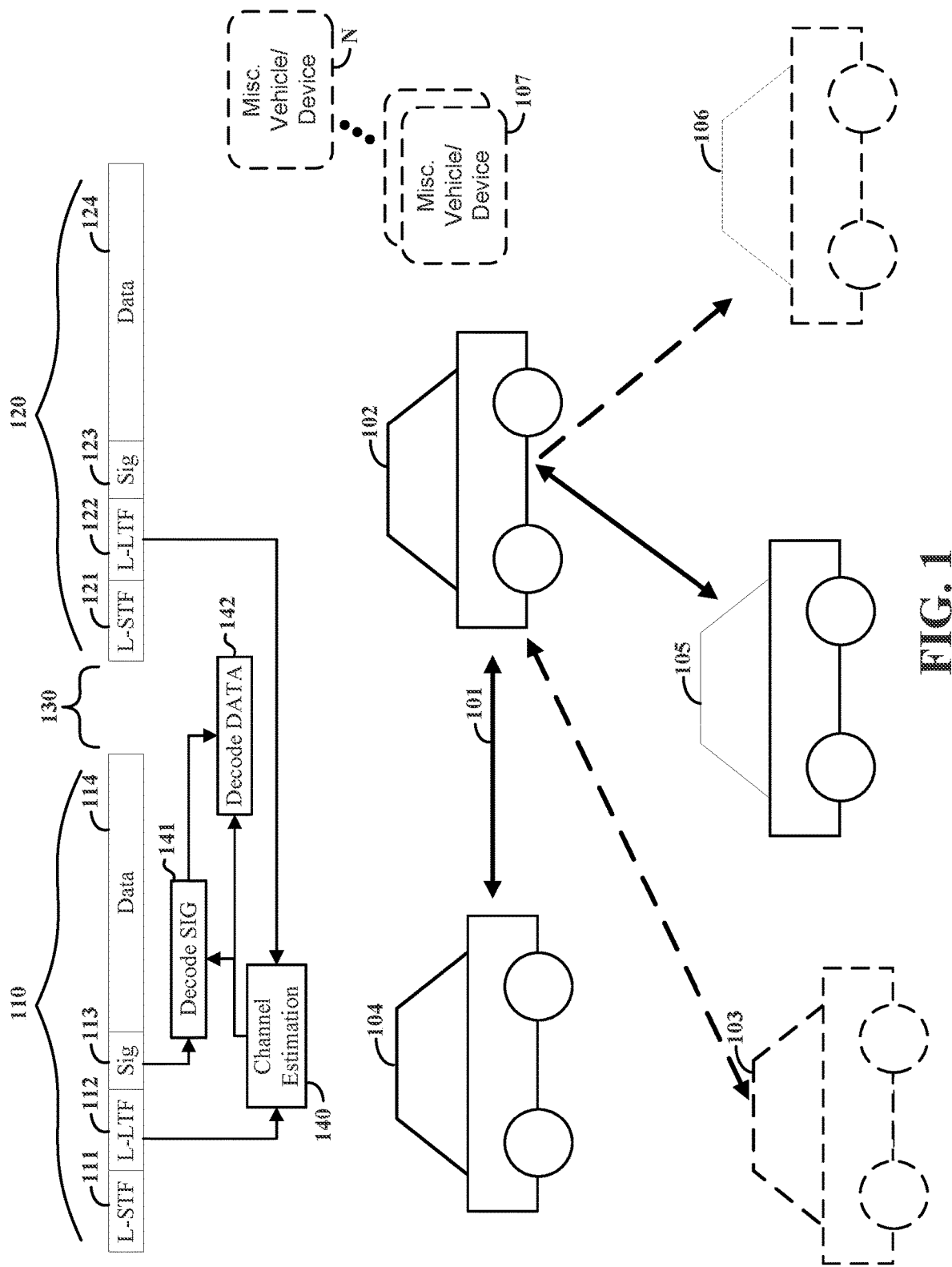
FIG. 1 is a system-level diagram illustrating an example communication environment and approach, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving wireless communications, utilizing respective communications messages to characterize/facilitate reception of other communications messages. In certain implementations, aspects of the present disclosure have been shown to be beneficial when used in the context of V2X type communications, and other communications that may involve the transmission of successive messages from a particular source, which may be repetitions. For instance, various aspects are directed to utilization in IEEE 802.11bd (NGV) technology for improving performance, and may alleviate possible interferences due to partial packet collision. In some embodiments, a preamble section of a successive/repetitive message is used to decode or otherwise process a previously-received message. In essence, the preamble of a repetition may be utilized as a postamble for a previous message, and can result in improved channel estimation quality and decoding (e.g., a previous packet may be decoded per symbol, starting from the end of the packet, utilizing the successively-received preamble). While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Aspects of the present disclosure are believed to be applicable to a variety of different types of apparatuses, systems and methods involving utilization of a preamble section in a message to decode or otherwise process aspects of a previously-received message, such as in applications utilizing repetitive communications (repetitions) in which the same message is repeated to facilitate accurate reception. In certain implementations, aspects of the present disclosure have been shown to be beneficial when used in the context of V2X communications, and in the context of communication environments in which messages are susceptible to communication errors.

In some embodiments, the preamble section of a repetition message, as received with a gap between a previous message, is used as a postamble for the previous message by refining the channel estimation and/or decoding the previous message using the legacy long-training field (L-LTF) section of the postamble. Accordingly, the L-LTF can be used to refine the channel estimation and/or to decode the previously-received message per symbol, and can do so starting from its end. In some implementations, this approach facilitates decoding of such a previous message in which the preamble section of the previous message is noisy or otherwise compromised (e.g., due to overlapping signals), which may for example affect channel estimation quality.

In various contexts, the preamble of a current message is used alone or in combination with the preamble of a previous message to enhance the channel estimation accuracy for the previous message, or to provide robustness in the event of partial interferences. The enhanced channel estimation can be used to obtain better performance when decoding the previous message and/or may facilitate decoding of the previous message in reverse. In certain receiver instances, such as those where the decoding of the data section is performed per OFDM symbol in order to allow a feedback loop for channel tracking purposes, a previous convolutional encoded message is decoded from both ends of a received packet using the preamble in the previous and current messages. For instance, Viterbi decoding may be carried out on sequential bits from the front of the data section of the previous message and going onwards, and from the back of the data section going backwards. By increasing the likelihood of correct decoding of the previous message, the likelihood of correctly decoding a repetition series may be enhanced. Further, the chances that the current (repetition) message is not needed where the previous message is decoded successfully can be enhanced, and which may reduce power consumption.

In various implementations, the time gap between completing reception of a previous message and onset of receiving the preamble section of a current message is utilized as being shorter than the coherence time of the channel. This approach may help ensure the usefulness of the preamble section in the current message for channel estimation/decoding of the previous message. Coherence time may be a function of the carrier frequency and doppler frequency, typically computed as coherence_time_usec=0.423/freq_doppler_Hz*1e6, leading for example to a coherence time of 108 μsec in the case of 5.9 GHz carrier frequency and Doppler frequency of 3.9 kHz (corresponding to a speed of 500 km/h at 5.9 GHz+0.2 kHz mismatch between the clocks of the transmitter and receiver). For instance a gap between repetitions in accordance with the IEEE 802.11-type standards may be smaller than the short interframe space (SIFS) that is 32 μsec, and may help ensure that the previous and current messages emanate from the same transmitter. For instance, assuming a gap of 32 μsec between repetitions, a time-gap from the LTF of the current message to the last OFDM symbol of a previous message may be 8/2 (middle of last OFDM symbol of previous packet)+32 (SIFS)+16 (L-STF)+16/2 (middle of L-LTF)=60 μsec, which may be smaller than the coherence time of 108 μsec mentioned previously. Coherency may also be used to ensure usefulness of the preamble section of a current message, relative to a previous message, to ensure that an acceptable coherence time is greater than any reception gap.

Further, as gap time increases, the preamble section of a current message may still be valid for later-received symbols in the previous message.

Accordingly, various embodiments may utilize the preamble section of a current message in connection with the processing of a previous message. Such approaches may facilitate improvement of the channel estimation quality, as may be used in conjunction with existing DATA symbol decoders. In some embodiments, information coming from both LTF sequences in a current and previous message are used, for example via interpolation, weighted sum, or averaging, which may improve channel estimation accuracy (and packet error rate (PER) performance), such as in receiver instances without a feedback loop.

Certain embodiments involve decoding DATA symbols (with a per symbol decoder), starting from the end of a received packet for a previously-received message, using the preamble of a current message. For instance, with messages communicated in accordance with the IEEE 802.11p standard having a continuous series of OFDM data symbols without any extra LTF sections between, such as in automotive applications and/or for coping with fast-varying channels, a per-symbol decoding scheme may be used for the OFDM data symbols with a feedback loop. The feedback loop is used to (e.g., continuously) update the channel estimation when sweeping over the OFDM symbols. Utilizing the preamble of a current message, decoding of the previous message can be started from the end of the packet. The initial channel estimate may be derived from the LTF in the current message, and the channel estimation may also updated along the way, sweeping over symbols in descending order.

In some embodiments, DATA symbols are decoded in both forward and backwards directions. For instance, a preamble of a previous message may be utilized to begin decoding symbols with a first-received symbol, and a preamble of a current message may be utilized to begin decoding symbols of the previous message with a last-received symbol and proceeding in reverse. Further, the data symbols may be decoded separately using each respective preamble section of the previous and current message, and the decoding may be compared or otherwise combined for accuracy.

In one such implementation, data symbols include a cyclic redundancy check (CRC) checksum. The same packet can be decoded forward and backward, and the best results of the two decodings may be used. For instance, the forward-going decoding can be carried out first using the preamble of the previous message. If the CRC of this decoding fails, the data symbols may be decoded from the end using the preamble of the current message. This technique may provide an improvement (e.g., in the range of 0.3 dB).

In another such implementation, decoded payloads are combined at bit level. For instance, if the CRC of both forward and backward decoding fails, the output of the decoder going forward may be used for the earlier data symbols (e.g., the first half of the payload), and the output of the decoder going backward may be used for the latter data symbols (e.g., the second half of the payload).

In still another implementation, the decoded symbols are systematically combined at the decoded bit level. Each decoder is run only until the "middle" or some other predefined portion of the payload, with the output of the decoder going forward (and using the previous message's preamble) used for the first part of the payload and the output of the decoder going backward (and using the current message's preamble) used for the last part of the payload.

Aspects of the present disclosure are directed to a method and/or related apparatus for receiving (e.g., via receiver circuitry) and processing (e.g., via coding circuitry) wireless transmissions from a wireless transmitter on a wireless communications channel. The wireless transmissions include a current message and a previous message received in succession with a time gap therebetween. Each message has a preamble section and a payload data section, the preamble including information for characterizing the wireless communications channel. The previous message is decoded based on the preamble section in the previous message and based on the preamble section in the current message. In such contexts, the decoding may be carried out in response to the current message being a repetition of the previous message, where such messages emanate from the same transmitter. Further, such approaches can enhance communications, such as in situations in which the preamble section in the previous message is damaged (and in response, the preamble of the current message is used in place thereof).

Various embodiments are directed toward applications in which the payload data includes a set of bits received sequentially in time, such as in an orthogonal frequency division multiplexing (OFDM) symbol, and beginning with a first bit and ending with a last bit. In some implementations, bits in the payload data section are decoded using the preamble of the current message, beginning with a last-received bit and continuing with previously received bits in reverse sequential order. In certain implementations, the preamble section in each of the current and previous message is used. For instance, the preamble section of the previous message may be used to decode a subset of the bits beginning with the first bit and continuing with subsequently received bits in sequential order. The preamble section of the current message may similarly be used to decode a subset of the bits beginning with the last bit and continuing with previously received bits in reverse sequential order. In some implementations, the preamble section of the previous message is used to decode a first portion of the bits, and the preamble section of the current message is used to decode a last portion of the bits (e.g., without overlap), and the results of the decoding may be combined. In other implementations, each decoding is used to decode all the bits, with the results of the decoding utilized together.

In the previously-described context and/or in other contexts herein, decoding may refer to performing channel estimation and subsequently using the channel estimation in the decoding of data in a payload section. For instance, the preamble section of the previous message may be used to determine a channel estimation of the communications channel, and the preamble section of the current message to refine the determined channel estimation. This refined channel estimation can then be used further in the decoding process. In other instances, the preamble section of a current message is used to provide a channel estimation for the previous message, such as may be useful when the preamble of the previous message is noisy due to interference.

In certain embodiments, the time gap between respective messages is assessed as an indication of whether the preamble section of the current message may be used for decoding the previous message. For instance, if the gap is less than a threshold time gap, the previous message may be assessed as being a repetition and thus decoded using the preamble section of the current message.

In a particular embodiment, a feedback loop is realized by means of re-encoding decoded bits, such as by re-encoding bits out of a Viterbi decoding procedure up to being modulation symbols, and comparing such re-encoded modulation symbols to the received equalization symbols. Feedback can thus be provided to characterize the decoding operation.

As noted above, various embodiments are directed to an apparatus utilized to carry out data reception and coding (e.g., for decoding a previous message). As such, certain embodiments are directed to an apparatus having communication circuitry and coding circuitry, in which the communication circuitry receives wireless transmissions as characterized above, and the coding circuitry decodes the previous message based on the preamble section in the previous message and based on the preamble section in the current message.

Turning now to the figures, FIG. 1 illustrates a system-level diagram illustrating an example communication environment and approach, in accordance with the present disclosure. By way of example, communications circuitry is shown within a plurality of vehicles 102-106 and other vehicles or devices 107-N such as may be implemented with traffic controllers, pedestrians, or other componentry. Certain embodiments are directed to a single such device, such as device 102, with other embodiments being directed to a system involving multiple such devices. Further, such communications may be carried out with a mix of enhanced (e.g., NGV) devices that utilize repetitions and may utilize the decoding approaches characterized herein, along with legacy type devices that may not use repetitions and/or the claimed decoding approaches.

Referring to device 102 by way of example, receiver circuitry therein may collect information wirelessly respectively from transmissions associated with one or more of the other vehicles/devices. Channel estimation block 140, signal (SIG) decoding block 141, and data decoding block 142 may be utilized within the device for processing communications 110 and 120 successively received with a time gap 130 therebetween. By way of example, each of these communications are shown having a preamble section with a short training field (STF) 111/121, long-training field (LTF) 112/122, and signal (SIG) field 113/123. Each communication also includes a payload section including data 114/124, such as may be implemented with OFDM symbols.

The channel estimation block 140 utilizes the LTF 122 (depicted as a legacy-LTF (L-LTF)) of the current communication 120 for providing channel estimation and decoding of the previous message 110 as characterized herein, such as for decoding the SIG field 113 and data section 114. In some implementations, the channel estimation block 140 generates the channel estimation based on the LTF 112 as well, such as by using both LTF sections and/or by determining that the preamble of the previous message 110 is damaged and thus avoiding use of LTF 112.

In certain embodiments, the LTF 112 is used to decode bits in the data section 114 starting with a last-received bit and working backwards toward a first-received bit. This approach may further utilize the LTF 112 to decode bits in the data section 114 beginning with a first-received bit and working forward toward the last-received bit. Accordingly, each LTF may be used to decode all of the bits separately and the results used together, or may be used to decode respective subsets of the bits that can then be combined.

Accordingly, vehicle 102 may communicate with one or more of the other vehicles/devices using such an approach in which the preamble section of repetitions may be used in decoding a previous message. The wireless communications depicted in FIG. 1 may involve V2X communications, which may include multiple types of communications such as: vehicle-to-vehicle (V2V), vehicle-to-infrastructure (V21), vehicle-to-network, (V2N) and vehicle-to-pedestrian (V2P). In specific instances, a V2X network may enable an exchange of information between a plurality of vehicles and, in some instances, other devices. As may be appreciated, as used herein "circuitry" refers to one or more circuits, such as a plurality of similarly-operating (or version of) circuits operating in respective vehicles, one or more of which may involve programmable devices utilizing software. The vehicles can communicate messages to one another, such as speed measurements, communication measurements, GPS data, etc., via the vehicular communications circuits.

The communication protocol technologies characterized herein, including legacy and other/NGV technologies, may be IEEE 802.11-based technology, such as IEEE 802.11p or other Wi-Fi technology. Referring to FIG. 1, each of the newer standard and older standard devices/vehicles may thus be implemented with communications circuitry that wirelessly communicates using a communications protocol that is consistent with Wi-Fi or IEEE 802.11p-based communications. The communications protocols used may involve sending messages asynchronously. For example, communications circuitry can observe (e.g., listen) the channel and communicate in response to the channel being clear (e.g., no messages being transmitted).

Figure 2:
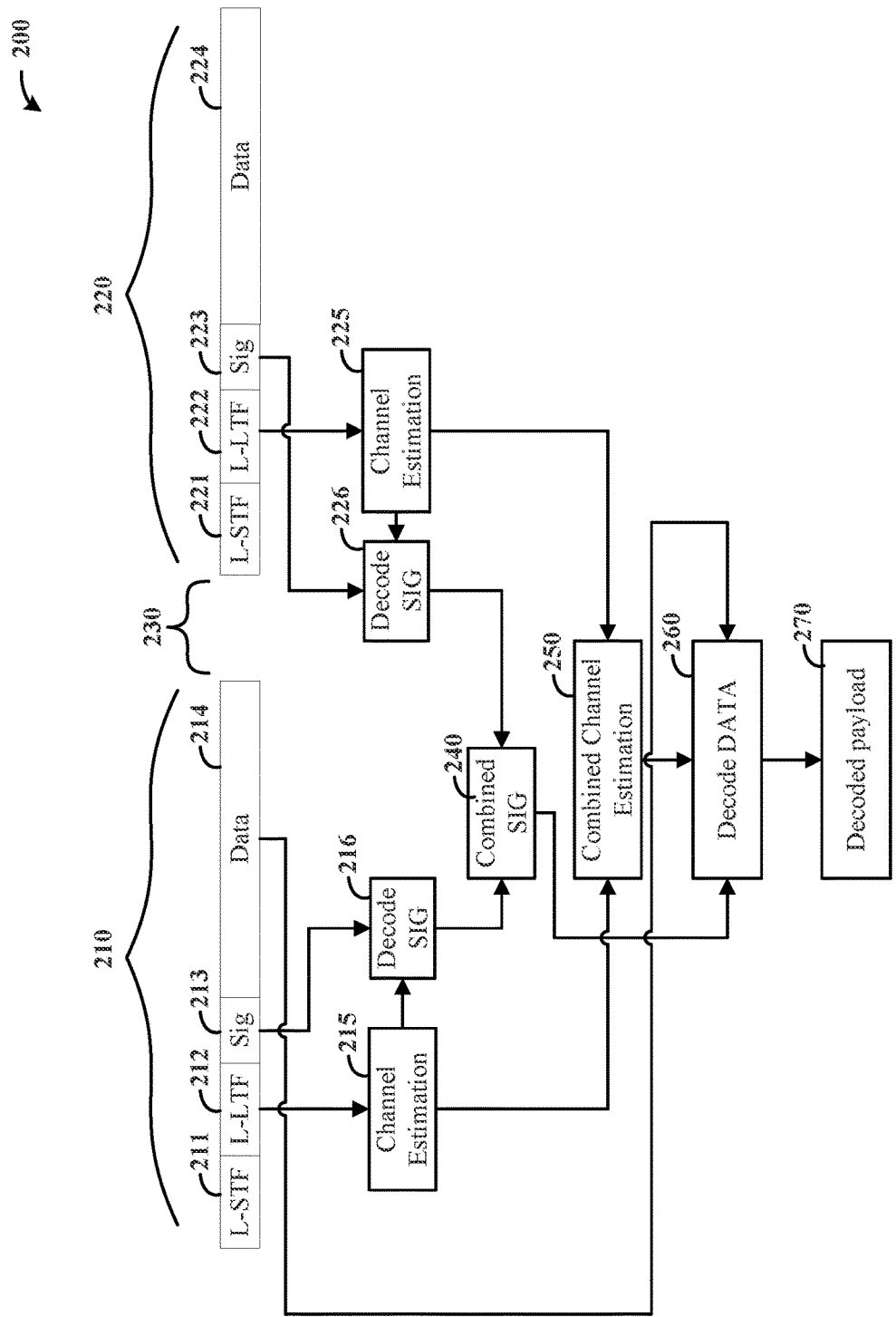
FIG. 2 shows circuitry and related communications processing, in accordance with the present disclosure.

FIG. 2 shows circuitry 200 for communicating wireless signals and related communications processing, in accordance with the present disclosure. By way of example, communications 210 and 220 are shown with a time gap 230 and as being similar to communications 110 and 120 in FIG. 1, having a preamble section with an STF 211/221, LTF 212/222, and SIG 213/223. Each communication also includes a payload section including data 214/224. Channel estimation blocks 215 and 225 perform channel estimation based on the LTF 212/222, and SIG decoding blocks 216 and 226 use their corresponding channel estimation block outputs to decode the SIG field from each communication, which are then combined at block 240. Channel estimation may also be combined at block 250 and used, along with the combined SIG, at block 260 for decoding the data section 214. The decoded payload may then be output at block 270. The circuitry 200 may be implemented, for example, with vehicle 102 and/or with other vehicles/devices shown in FIG. 1. Further, antenna, transmitter and receiver circuitry may also be utilized in connection with the circuit blocks.

In certain embodiments, the SIG symbols 213/223 are decoded separately (e.g., as in FIG. 1), using channel estimation obtained from the adjacent L-LTF symbol 212/222. For decoding the data section 214 of the previous packet, information from either one of the SIG symbol decoding, or from a combined decoding, may be used.

Figure 3:
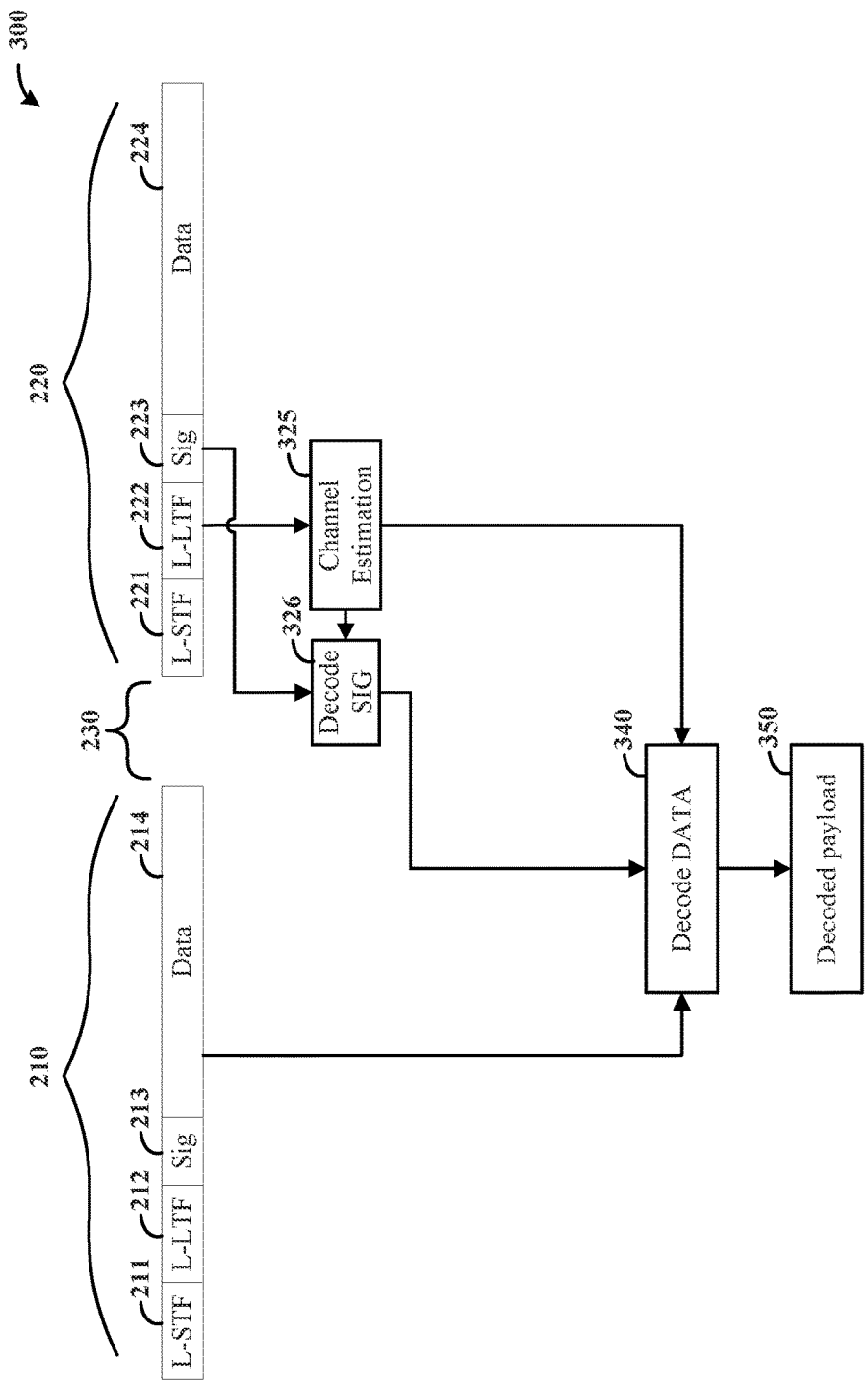
FIG. 3 also shows circuitry and related communications processing, in accordance with the present disclosure.

FIG. 3 shows circuitry 300 for communicating wireless signals and related communications processing, in accordance with the present disclosure. By way of example messages 210 and 220 are again shown and labeled in accordance with the corresponding messages in FIG. 2. In this instance, channel estimation is carried out at block 325 using LTF 222, and the output thereof is used to decode the SIG section at block 326. These decoded sections are then used at block 340 to decode the data section 214 of message 210, and decoded payload 350 is output therefrom.

As may be appreciated, communications (and as may be applicable, communication networks) are not limited to the number of stations and/or communications circuitries as illustrated by FIGS. 1, 2 and 3. Various embodiments can include greater or fewer stations having communications circuitries in a shared device geography, and additional or fewer types of stations having communications circuitries (e.g., mobile phones). The number of stations can also change over time due to movement of vehicles or other stations and/or additional stations entering the shared station geography (e.g., forming ad-hoc network(s)).

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, transmitter, receiver, transceiver and/or other circuit-type depictions (e.g., reference numerals 140, 141 and 142 may depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with the channel estimation/decoding approaches, or as described with the figures, is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Aspects of the present disclosure are directed to wireless communications involving successively-received messages. As may be implemented consistent with one or more aspects characterized herein, a preamble section of a currently-received message is used in decoding a previously-received message, for wireless transmissions from a wireless transmitter on a wireless communications channel. The current and previous message are received in succession with a time gap therebetween.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, further-received messages may be utilized to assess previously-received messages in a similar manner. In addition, messages received on different channels concurrently, overlapping or successively may be utilized in a similar manner. Such modifications do not depart from the true spirit and scope of various aspects of the disclosure, including aspects set forth in the claims

The invention claimed is:

1. A method comprising:
receiving wireless transmissions from a wireless transmitter on a wireless communications channel, the wireless transmissions including a current message and a previous message received in succession with a first time gap therebetween, each message having a preamble section and a payload data section, the preamble section comprising a short training field, a long training field, and a signal field, the preamble including information for characterizing the wireless communications channel, wherein the first time gap is adjacent to the data section of the previous message and the short training field of the current message; and
decoding bits of an orthogonal frequency division multiplexing (OFDM) symbol in the previous message based on the long training field and signal field of the preamble section in the current message and not on a preamble section of the previous message in response to a second time gap between the long training field of the current message and the OFDM symbol in the payload data section of the previous message being less than a coherence time of the channel; and in response to the current message being a repetition of the previous message;
wherein each payload data section includes a respective set of bits mapped to a set of OFDM symbols and received sequentially in time, beginning with a first received bit in a first ODFM symbol and ending with a last received bit in a last OFDM symbol;
decoding the previous message includes:
Viterbi decoding the bits of the payload data section which are convolutionally encoded, in reverse sequential order beginning with the last received bit and continuing with previously received bits based on the preamble section in the current message to determine a set of decoded bits.

2. The method of claim 1, further comprising
decoding the previous message
using the preamble section of the previous message to decode a subset of the bits beginning with the first bit and continuing with subsequently received bits in the received sequential order.

3. The method of claim 1, wherein decoding the previous message includes:
using a long training field of the preamble section of the current message to determine an initial channel estimation of the communications channel representative of the channel when the current message is received, decoding a subset of the bits in the payload data section of the previous message based on the channel estimation and corresponding to a last OFDM symbol of the packet, continuously decoding in the reverse sequential order remaining bits towards the first received bit in the payload data section of the previous message using an updated channel estimation, and continuously updating the channel estimation as the remaining bits are decoded in the reverse sequential order.

4. The method of claim 1,
further including computing the coherence time of the channel based on the long training field of the current packet and assessing whether the second time gap is less than the coherence time of the channel; and
wherein decoding the previous message is carried out in response to the second time gap being less than the coherence time of the channel.

5. The method of claim 1, wherein decoding the previous message includes using the preamble section in the current message to decode the payload data section of the previous message in response to the preamble section in the previous message being damaged.

6. The method of claim 1, further including providing feedback by re-encoding decoded bits from the previous message to generate re-encoded modulation signals, and comparing the re-encoded modulation symbols to received equalization symbols of the previous message.

7. The method of claim 1, wherein decoding the previous message comprises decoding based on the preamble section in the previous message and based on the preamble section in the current message which includes using the preamble section in the current message to generate a channel estimation for the channel on which the messages are received.

8. The method of claim 1, wherein the coherence time is derived from a carrier frequency of the messages and a doppler frequency estimation.

9. The method of claim 1, wherein the second time gap is a duration between a middle of the long training field of the current message and a middle of a last OFDM symbol in the payload data section of the previous message.

10. An apparatus comprising:
communication circuitry configured to receive wireless transmissions from a wireless transmitter on a wireless communications channel, the wireless transmissions including a current message and a previous message received in succession with a first time gap therebetween, each message having a preamble section and a payload data section, the preamble section comprising a short training field, a long training field, and a signal field, the preamble including information for characterizing the wireless communications channel, wherein the first time gap is adjacent to the data section of the previous message and the short training field of the current message; and
coding circuitry configured to decode bits of an orthogonal frequency division multiplexing (OFDM) symbol in the previous message based on the long training field and signal field of the preamble section in the current message and not on a preamble section of the previous message in response to a second time gap between the long training field of the current message and the OFDM symbol in the payload data section of the previous message being less than a coherence time of the channel; and in response to the current message being a repetition of the previous message;
wherein each payload data section includes a respective set of bits mapped to a set of OFDM symbols and received sequentially in time, beginning with a first received bit in a first ODFM symbol and ending with a last received bit in a last OFDM symbol; and
wherein the coding circuitry configured to decode the previous message further includes circuitry to:

Viterbi decode the bits of the payload data section which are convolutionally encoded, in reverse sequential order beginning with the last received bit and continuing with previously received bits based on the preamble section in the current message to determine a set of decoded bits.

11. The apparatus of claim 10, wherein the coding circuitry is configured to further decode the previous message by:
using the preamble section of the previous message to decode a subset of the bits beginning with the first bit and continuing with subsequently received bits in the received sequential order.

12. The apparatus of claim 10, wherein the coding circuitry is configured to decode the previous message by:
using the long training field of the preamble section of the current message to determine an initial channel estimation of the communications channel representative of the channel when the current message is received, decoding a subset of the bits in the payload data section of the previous message based on the channel estimation and corresponding to a last OFDM symbol of the packet, and continuously decoding in the reverse sequential order remaining bits towards the first received bit in the payload data section of the previous message using an updated channel estimation, and continuously updating the channel estimation as the remaining bits in the reverse sequential order are decoded.

13. The apparatus of claim 10, wherein the coding circuitry is configured to compute the coherence time of the channel based on the long training field of the current packet and assess whether the second time gap is less than the coherence time of the channel, and to decode the previous message in response to the second time gap being less than the coherence time of the channel.

14. The apparatus of claim 10, wherein the coding circuitry is configured to decode the previous message using the preamble section in the current message to decode the payload data section of the previous message, in response to the preamble section in the previous message being damaged.

15. The apparatus of claim 10, wherein the coding circuitry is configured to:
re-encode decoded bits of the payload data section in the previous message; and
assess errors in the decoding of bits in the previous message by comparing the re-encoded bits to received bits in the payload data section of the previous message.

16. The apparatus of claim 15, wherein the coding circuitry is configured to:
adjust the decoding of the previous message in response to the assessing indicating errors in the decoding of the bits in the payload data section of the previous message; or
decode the previous message by using the preamble section in the current message to generate a channel estimation for the channel on which the messages are received.

17. The apparatus of claim 10, wherein the coherence time is derived from a carrier frequency of the messages and a doppler frequency estimation.

18. The apparatus of claim 10, wherein the second time gap is a duration between a middle of the long training field of the current message and a middle of a last OFDM symbol in the payload data section of the previous message.

19. A method comprising:
receiving wireless transmissions from a wireless transmitter on a wireless communications channel, the wireless transmissions including a current message and a previous message received in succession with a first time gap therebetween, each message having a preamble section and a payload data section, the preamble section comprising a short training field, a long training field, a long training field, and a signal field, the preamble including information for characterizing the wireless communications channel, the payload data including a set of bits received sequentially in time in an orthogonal frequency division multiplexing (OFDM) symbol, wherein the first time gap is adjacent the data section of the previous message and the short training field of the current message; and
decoding an orthogonal frequency division multiplexing (OFDM) symbol in the previous message based on the long training field and signal field of the preamble section in the current message and not on a preamble section of the previous message in response to a second time gap between the long training field of the current message and the OFDM symbol in the payload data section of the previous message being less than a coherence time of the channel; and in response to the current message being a repetition of the previous message;
wherein each payload data section includes a respective set of bits mapped to a set of OFDM symbols and received sequentially in time, beginning with a first received bit in a first ODFM symbol and ending with a last received bit in a last OFDM symbol;
decoding the previous message includes:
Viterbi decode the bits of the payload data section of the symbol which are convolutionally encoded, in reverse sequential order beginning with the last received bit and continuing with previously received bits based on the preamble section in the current message to determine a set of decoded bits.

20. The method of claim 19, wherein decoding the previous message includes:
using the long training field of the preamble section of the previous message to determine an initial channel estimation of the communications channel representative of the channel when the current message is received, decoding a subset of the bits in the payload data section of the previous message based on the initial channel estimation and corresponding to a last OFDM symbol of the packet, continuously decoding in the reverse sequential order remaining bits towards the first received bit in the payload data section of the previous message using an updated channel estimation, and continuously updating the channel estimation as the remaining bits in the reverse sequential order are decoded.

21. The method of claim 19, further including computing the coherence time of the channel based on the long training field of the current packet and assessing whether the time gap is less than the coherence time of the channel, and wherein decoding the previous message is carried out in response to the second time gap being less than the coherence time of the channel.

22. The method of claim 19, wherein the coherence time is derived from a carrier frequency of the messages and a doppler frequency estimation.

23. The method of claim 19, wherein the second time gap is a duration between a middle of the long training field of the current message and a middle of a last OFDM symbol in the payload data section of the previous message.

\* \* \* \* \*